(12) United States Patent
Zambrano

(10) Patent No.: US 11,206,814 B2
(45) Date of Patent: Dec. 28, 2021

(54) HORSE ANTI-CRIBBING COLLAR

(71) Applicant: Victor Zambrano, Versailles, KY (US)

(72) Inventor: Victor Zambrano, Versailles, KY (US)

(*) Notice: Subject to any disclaimer, the term of this patent is extended or adjusted under 35 U.S.C. 154(b) by 155 days.

(21) Appl. No.: 15/374,704

(22) Filed: Dec. 9, 2016

(65) Prior Publication Data
US 2018/0160653 A1   Jun. 14, 2018

(51) Int. Cl.
*A01K 15/04*   (2006.01)
*A01K 27/00*   (2006.01)
*A01K 13/00*   (2006.01)

(52) U.S. Cl.
CPC ............ *A01K 15/04* (2013.01); *A01K 13/006* (2013.01); *A01K 27/001* (2013.01)

(58) Field of Classification Search
CPC ...... A01K 5/008; A01K 13/006; A01K 15/04; A01K 27/001; B68B 3/06; B68B 3/08; B68B 3/12; B68B 3/04
See application file for complete search history.

(56) References Cited

U.S. PATENT DOCUMENTS

| | | | | |
|---|---|---|---|---|
| 202,201 | A * | 4/1878 | Staufenbeil | B68B 3/06 54/19.3 |
| 5,628,283 | A * | 5/1997 | Huegelmeyer | A01K 13/006 119/815 |
| 5,697,328 | A * | 12/1997 | Hunter | A01K 13/006 119/714 |
| 8,726,849 | B1 * | 5/2014 | Billig | A01K 13/006 119/853 |
| 2016/0324119 | A1 * | 11/2016 | Mills | A01K 13/007 |
| 2016/0360727 | A1 * | 12/2016 | Weber | A01K 13/003 |
| 2017/0196198 | A1 * | 7/2017 | Scott | A01K 13/00 |

OTHER PUBLICATIONS

See Attached Protest, Affidavit, and Exhibits mailed Mar. 28, 2017 that may relate to the above-referenced application.

* cited by examiner

*Primary Examiner* — Jessica B Wong
(74) *Attorney, Agent, or Firm* — Francis Law Firm PLLC; James M. Francis

(57) ABSTRACT

An anti-cribbing collar, including a rigid stock including a first end that is connected with a tongue and the rigid stock including a second end connected with a receiver configured to receive the tongue, and a ring secured to the rigid stock by a support strap passing through the ring.

7 Claims, 4 Drawing Sheets

HORSE ANTI-CRIBBING COLLAR

FIELD OF THE INVENTION

The present invention relates generally to preventing cribbing behavior in horses.

BACKGROUND

Horse cribbing is a complex behavior that is not well understood. Cribbing occurs when a horse arches its neck, bites a support, pulls, and sucks in air. Cribbing is believed to contribute to colic. Furthermore, cribbing is believed to be exhibited in about five percent of horses and eight percent of thoroughbreds. Due to the increased health risk to the horses, cribbing behavior is not desired.

SUMMARY

An anti-cribbing collar, including a rigid stock including a first end that is connected with a tongue and the rigid stock including a second end connected with a receiver configured to receive the tongue, and a ring secured to the rigid stock by a support strap passing through the ring.

An anti-cribbing collar having a reduced pinch point, including a rigid stock comprising a first end including a tongue and a second end including a receiver, wherein the rigid stock, a tongue base of the tongue, and a receiver base of the receiver are integrally formed.

BRIEF DESCRIPTION OF THE DRAWINGS

Various aspects of the present invention are illustrated by way of example, and not by way of limitation, in the accompanying drawings, wherein.

DETAILED DESCRIPTION OF THE PREFERRED EMBODIMENTS

Figure 1:
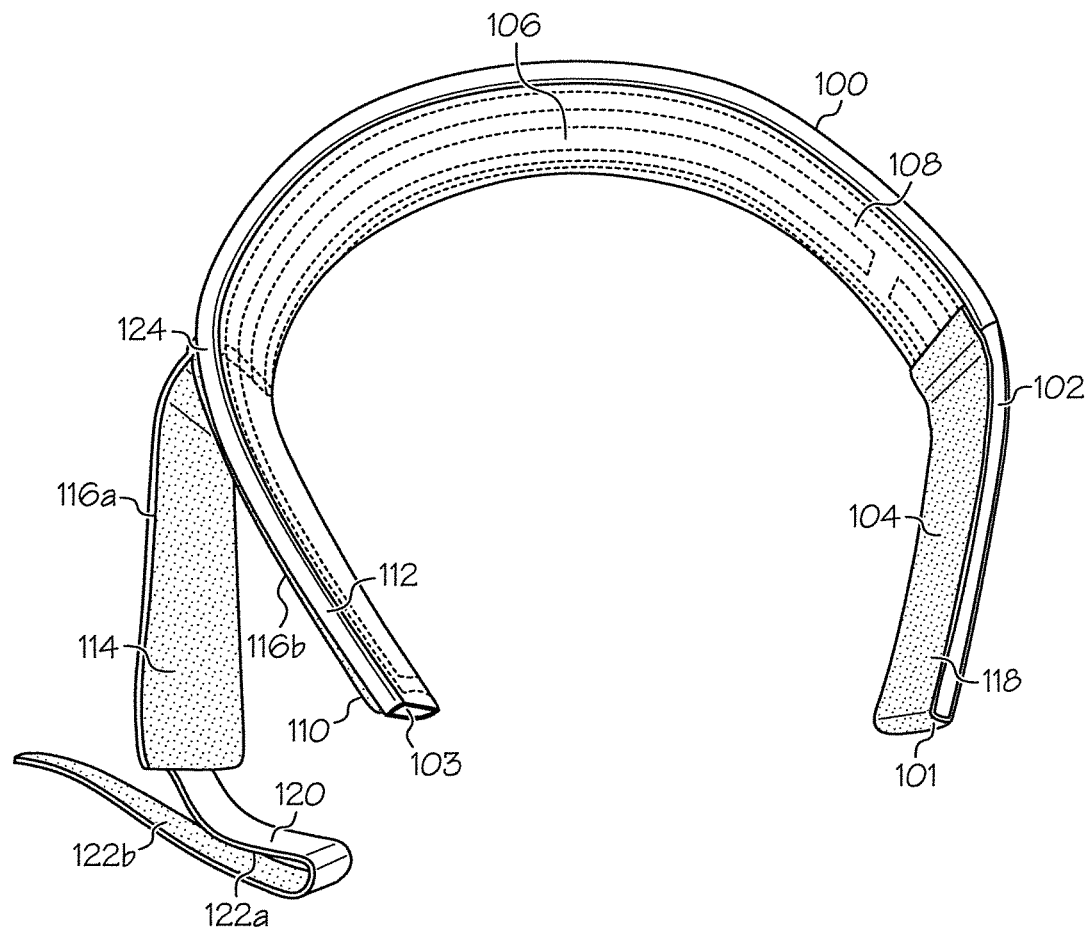
FIG. 1 depicts a diagram of an anti-cribbing collar in accordance with the principles of the present invention.

The present invention relates generally to reducing cribbing behavior in horses. Horse cribbing is a complex behavior that is not well understood. Cribbing occurs when a horse arches its neck, bites a support, pulls, and sucks in air. Cribbing is believed to contribute to colic. Cribbing may also cause epiploic foramen entrapment, which may cut off the blood supply to part of the horse's small intestine. Without proper blood supply, this section of intestine may die. The dead intestine may release toxins into the blood stream that may result in death. Furthermore, cribbing is believed to be exhibited in about five percent of horses and eight percent of thoroughbreds. Due to the increased health risk to the horses, cribbing behavior is not desired. Furthermore, some thoroughbreds are worth more than $1 million. Cribbing prevention is a worthwhile investment to protect the horse.

Cribbing may be impeded or prevented by surgical means, such as weakening certain neck muscles so that the horse's ability to arch its neck is reduced. Cribbing may also be inhibited by non-surgical means, such as by a rigid collar that closes the horse's windpipe when the neck is arched.

An anti-cribbing collar may be applied to a horse's neck such that the windpipe may be restricted when the horse arches its neck. However, many anti-cribbing collars are not sturdy enough to withstand tugging by another horse or foal. These anti-cribbing collars may comprise a base of two layers of nylon or polypropylene mesh wrapped in leather. Some of these embodiments only utilize thread gauges of 69 and 92 gauge thread. The anti-cribbing collar of the present invention may provide increased durability to withstand such stress by use of rigid materials. Embodiments of the present invention utilize configurations capable of withstanding tensile stress, 207 and 277 gauge thread, and/or stronger materials.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the description herein, reference is made to a horse by way of example only and one of ordinary skill will recognize that other functionally equivalent animals. For example, one of ordinary skill will recognize that the principles of the present invention can be applied to any animal found to exhibit cribbing behavior without departing from the scope of the present invention.

In the description herein, references to cribbing also include windsucking.

In the description herein, "hingeably" and similar variations refer to rotation about a point as if on a hinge. Thus, a hinge may not be necessary for a hingeable relationship.

In the description herein, "about" means within plus or minus one at the last reported digit. For example, about 1.00 means 1.00±0.01 unit. In fractions, about 1 1/16 units means from 1 0/16 units to 1 2/16 units.

"Proximate," as used herein to describe a position of an element relative to one object of a set of multiple objects, conveys that the element is positioned closer to the one object than any other object of the set.

"Substantially," as used herein with reference to a shape, means within manufacturing tolerance of manufacturing the referenced shape as well as any other shape falling within the doctrine of equivalents for the referenced shape.

"Substantially similar," as used in this application, means having at least each of the properties of the referenced structure plus additional structure disclosed and applying any changes disclosed. If the additional structure conflicts, the additional structure supersedes the structure incorporated by reference.

In the description herein, "hook and loop" means either counterpart of hook and loop or both counterparts together, according to the understanding of one of ordinary skill in the art based on the context of usage. "Hook" or "loop" means one counterpart or the other, and may be interchangeable, as can easily be done by one of ordinary skill in the art. By way of example, hook and loop can be purchased from Velcro Companies.

For the purposes of this disclosure, "and" and "or" shall be construed as conjunctively or disjunctively, whichever provides the broadest disclosure in each instance of use.

For the purposes of this disclosure, structures disclosed in singular form are not limited to a singular structure, but can include multiple instances of the disclosed structure, unless specifically stated otherwise.

For the purposes of this disclosure, "connected with" also encompasses and further describes embodiments comprising elements that are "connected to" and "integrally formed with."

The detailed description set forth below in connection with the appended drawings is intended as a description of various embodiments of the invention and is not intended to represent the only embodiment in which the invention may be practiced without these specific details. In some instances, well known structures an components are shown in block diagram form in order to avoid obscuring the concepts of the invention.

FIG. 1 depicts a diagram of an anti-cribbing collar 100 in accordance with the principles of the present invention. The anti-cribbing collar 100 may comprise a tongue 104 at a first end 101 and a receiver 110 at a second end 103. The tongue 104 may refer generally to the section of the anti-cribbing collar 100 that is insertable into receiver 110 and may have an attachment mechanism compatible with one or more parts of the receiver 110. The receiver 110 may refer generally to the section of the anti-cribbing collar 100 that may be configured to receive the tongue 104 and may have an attachment mechanism compatible with one or more parts of the tongue 104

The anti-cribbing collar 100 may comprise a rigid stock 102. The rigid stock 102 may have a length sufficient to wrap around a horse's neck and attach to itself. For example, the length may be about 76.2 cm (2.5 ft.) The rigid stock 102 may have a width sufficient to significantly restrict (e.g. substantially close) a horse's windpipe when worn and when the neck is arched. For example, the width may be about 7.9 cm (3⅛ in.). The rigid stock 102 may comprise one or more materials of sufficient rigidity to withstand the arching of the horse's neck and to partially or completely close the horse's windpipe. Example materials include nylon webbing coated with polyurethane, thermoplastic polyurethane (TPU), polyvinylchloride (PVC), or other rigid coatings provided by BioThane Coated Webbing Corp. (as can be presently purchased as BioThane) or Weaver Leather Goods, Inc. (as can be presently purchased as Brahma Webb) or any other durable rubber, plastic, etc. having sufficient rigidity. By way of example, the rigid stock 102 may support the weight of a 200 pound person standing on the anti-cribbing collar when closed according to the depictions of FIGS. 7 and 8. Rigid stock 102 may be about 0.6 cm (¼ in.) in width.

Sleeve 106 may surround part or all of rigid stock 102. For example, sleeve 106 may extend from the second end 103 to the tongue 104. Thus, the length of sleeve 106 may be about 60.0 cm (23⅝ in.), in some embodiments. The sleeve 106 may comprise leather or synthetic leather, such as pleather. Synthetic leathers may be easier to clean and/or disinfect than natural leathers. Furthermore sleeve 106 may be attached to rigid stock 102 by tape between the rigid stock 102 and the sleeve 106. Additionally, stitches 108 may be sewn through each of the layers.

The tongue 104 may comprise a section of the rigid stock 102 at or near the second end 101 of the anti-cribbing collar 100. The tongue 104 may be integrally formed with the rigid stock 102. In some embodiments, the tongue 104 may be connected with and/or directly connected to the rigid stock 102. The tongue may comprise a tongue attachment mechanism 118. The receiver 110 may be connected with and/or connected to the rigid stock 102. In some embodiments. the receiver base 112 may be integrally formed with rigid stock 102.

In some embodiments, the tongue attachment mechanism 118 may span the interior surface of the anti-cribbing collar 100 as well as the exterior of the anti-cribbing collar 100. The tongue attachment mechanism 118 may not necessarily comprise a single, continuous form and may comprise two or more separate pieces.

The tongue attachment mechanism 118 may be sufficient size and strength to attach to the interior of the receiver 110. For example, when configured in the position depicted in FIGS. 7 and 8, the tongue attachment mechanism 118 may be strong enough to contribute to the anti-cribbing collar's 100 resistance to tugging by other horses.

Embodiments of the tongue attachment mechanism 118 include hook and loop such as Velcro. In such embodiments, the tongue attachment mechanism 118 may be configured to mate with any attachment mechanism of the receiver 110. For example, hook and loop may be positioned such that tongue 104 is secured by any attachment mechanism of the receiver 110. In some embodiments, the tongue attachment mechanism 118 may comprise a loop section of hook and loop. The mating section of the receiver 110 may comprise hook, such that the tongue 104 may be secured in the receiver 110.

In some embodiments, the tongue attachment mechanism 118 may span from a tip of the first end 101 about 17.8 cm (7.0 in.) into the length of the rigid stock 102. In these embodiments, the tongue attachment mechanism 118 may overlap a portion of the sleeve 106 to form an overlapping portion 105. For example, this overlapping portion 105 may span about 1.4 cm (9/16 in.). Embodiments having a continuous tongue attachment mechanism 118 may comprise a tongue attachment mechanism 118 having a length of 36.8 cm (14.5 in.). In combination with the rigidity of rigid stock 102, the overlapping portion 105 may allow attachment of the tongue 104 within receiver 110 such that a pinch point between the sleeve 106 and tongue attachment mechanism 118 may be avoided. However, embodiments of the present invention may not necessarily include the overlapping portion 105.

Stitching 108 may span at least a portion of the length from the first end 101 to the second end 103. Stitching 108 may comprise 277 gauge thread. Stitches securing hook and loop may comprise 207 gauge thread. However, embodiments include 69 and 92 gauge thread. Stitching 108 will be described further with respect to FIGS. 5 and 6.

The receiver 110 may comprise a section of the rigid stock 102 at or near the second end 103. The receiver 110 may further comprise a receiver flap 114. The receiver flap 114 may be hingeably connected with the rigid stock 102. For example, the hingeable connection 124 may be formed by thread. In the depicted embodiment, the hingeable connection 124 is formed with 277 gauge thread.

The receiver flap 114 may comprise any material similar to the material of the sleeve 106. The receiver flap 114 may be sized and shaped to receive the tongue 104. The receiver flap 114 may be configured to securely attach to tongue 104. The receiver flap 114 may be about 17.8 cm (7.0 in.) in length. The receiver flap 114 may be about 8.10 cm (3 3/16 in.) in width. For example, the width of the receiver flap 114 may be substantially similar to the width of the rigid stock 102. The receiver flap 114 may comprise a receiver first receiver attachment mechanism 116a on the inside surface of the receiver flap 114. The first receiver attachment mechanism 116a may comprise any mechanism configured to securely attach the tongue 104. For example, the first receiver attachment mechanism 116a may comprise one or both of hook and loop configured to attach to hook and loop of the tongue 104. In some embodiments, the size of the hook and loop of the first receiver attachment mechanism 116a may be substantially similar to the size of the receiver flap 114.

The receiver 110 may also comprise a receiver base 112. The receiver base 112 may be the portion of the receiver 110 that is formed in part by the rigid stock 102 and/or the sleeve 106. The receiver 110 may also comprise a second receiver attachment mechanism 116b on the surface of the receiver base 112 oriented inside the receiver. For example, the size of the second receiver attachment mechanism 116b may be substantially similar to the size of the first receiver attachment mechanism 116a. The second receiver attachment mechanism 116b may be sized and configured to mate with the tongue attachment mechanism 118 such that the tongue 104 can be securely attached within the receiver 110. The second receiver attachment mechanism 116b may comprise one or more of hook and loop configured to mate with hook and loop of the tongue 104. In some embodiments, the size of the hook and loop of the second receiver attachment mechanism 116b may be substantially similar to that of the hook and loop of one side of the tongue 104.

The receiver 110 may further comprise a securing strap 120. The securing strap 120 may be attached to the outside of receiver flap 114. The securing strap 120 may be about 36.8 cm (14½ in.) in length. The securing strap 120 may be about 2.7 cm (1 1/16 in.) in width. The securing strap 120 may comprise nylon or polypropylene webbing. The securing strap 120 may comprise a first securing strap attachment mechanism 122a and a second securing strap attachment mechanism 122b. The first securing strap attachment mechanism 122a may be configured to reversibly attach to the second securing strap attachment mechanism 122b. The first securing strap attachment mechanism 122a may span about 24.1 cm (9½ in.) from the end of the securing strap 122 that is attached to the receiver flap 114 toward the opposite end of securing strap 122. The second securing strap attachment mechanism 122b span about 11.6 cm (4 9/16 in.) from the opposite end of securing strap 122 toward the receiver flap 114. The first securing strap attachment mechanism 122a and the second securing strap attachment mechanism 122b may be mated to form a secure reversible attachment, such as opposite parts of hook and loop.

Figure 2:
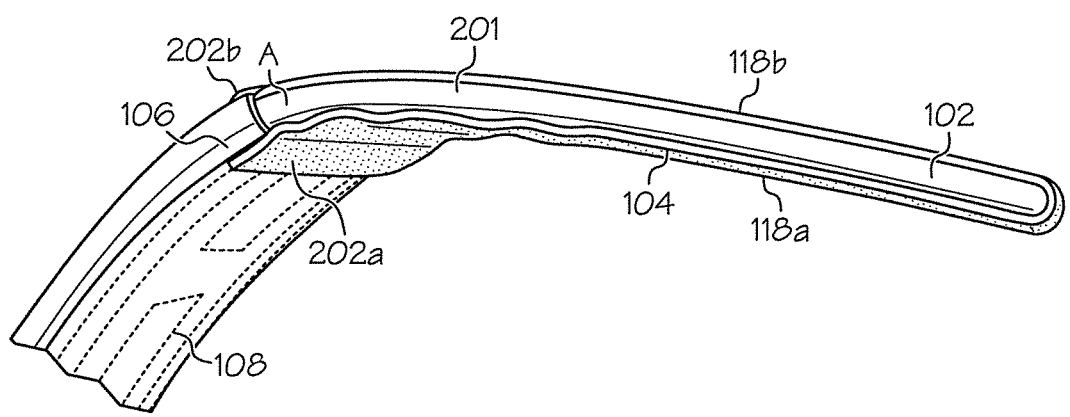
FIG. 2 depicts a diagram of a tongue of the anti-cribbing collar of FIG. 1 in accordance with the principles of the present invention.

FIG. 2 depicts a diagram of the tongue 104 of the anti-cribbing collar 100 of FIG. 1 in accordance with the principles of the present invention. The tongue 104 may comprise a tongue base 201. The tongue base of some anti-cribbing collars are merely one or more layers of nylon or polypropylene webbing attached to hook and loop. However, the flexibility of this tongue base can cause a pinch point at or near point A of FIG. 2 when the tongue is secured in the receiver. Embodiments of the present invention include the tongue base 201 comprise substantially similar materials of the rigid stock 102. In some embodiments of the present invention, the tongue base 201 is integrally formed with rigid stock 102 (e.g. rigid stock 102 may extend through the sleeve 106 and the tongue 104 as a single, continuous piece). In this manner, point A may not necessarily form a pinch point when the collar is closed on the horse's neck.

Furthermore, the tongue attachment mechanism 118 may comprise a first side 118a and a second side 118b. In some embodiments, first side 118a and second side 118b may be separate attachment mechanisms. For example, separate pieces of hook and loop may be placed on opposite sides of the tongue 104. Embodiments include a continuous piece of hook and loop wrapped around both sides of the tongue 104.

As can be seen, overlapping portion 202 may comprise an inside overlapping portion 202a and an outside overlapping portion 202b. The overlapping portions 202a and 202b may allow attachment of the tongue 104 within receiver 110 such that a pinch point may be avoided. For example, some anti-cribbing collars merely include one or two layers of nylon or polypropylene webbing wrapped in a leather sleeve. Furthermore, these embodiments don't necessarily include overlapping portions 202a, 202b. These embodiments may not necessarily prevent a pinch point due to the flexing of the base of tongue 104 where the sleeve 106 ends. Therefore, the material of the rigid stock 102 may be sufficiently rigid to avoid this pinch point. Furthermore, the sleeve 106 under the overlapping portions 202a, 202b may provide additional support to the rigid stock 102.

Figure 3:
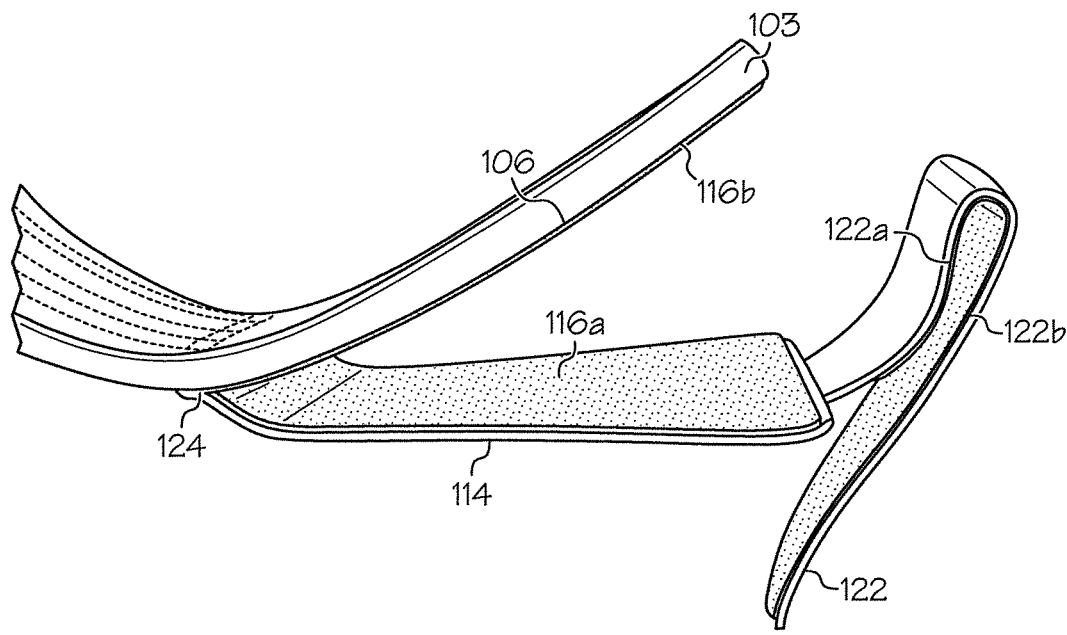
FIG. 3 depicts a diagram of a receiver of the anti-cribbing collar of FIG. 1 in accordance with the principles of the present invention.

FIG. 3 depicts a diagram of the receiver 110 of the anti-cribbing collar 100 of FIG. 1 in accordance with the principles of the present invention. The receiver 110 may be positioned at the second end 103 of collar 100. The receiver 110 may be configured to receive tongue 104 and may further secure tongue 104 within receiver 110. For example, receiver 110 may comprise a section of rigid stock 102 hingeably connected with the receiver flap 114. By way of example, the hingeable connection 124 may comprise one, two, or more rows of 277 gauge thread wherein receiver flap 114 is sewn to receiver 110.

In addition, receiver 110 may be wrapped in sleeve 106. Furthermore, the second receiver attachment mechanism 116b may be position on the inside of the receiver 110, either on the rigid stock 102 or on the sleeve 106. The second receiver attachment mechanism 116b may comprise one or more pieces of hook and loop configured to mate with the first side 118a of tongue attachment mechanism 118.

The receiver flap 114 may comprise leather or artificial leather coupled with a receiver flap attachment mechanism 116a. The receiver flap attachment mechanism 116a may comprise one or more sections of hook and loop configured to mate with the second side 118b of tongue attachment mechanism 118. Securing strap 122 may also be attached to receiver flap 114. Securing strap 122 may comprise nylon or polypropylene webbing.

Figure 4:
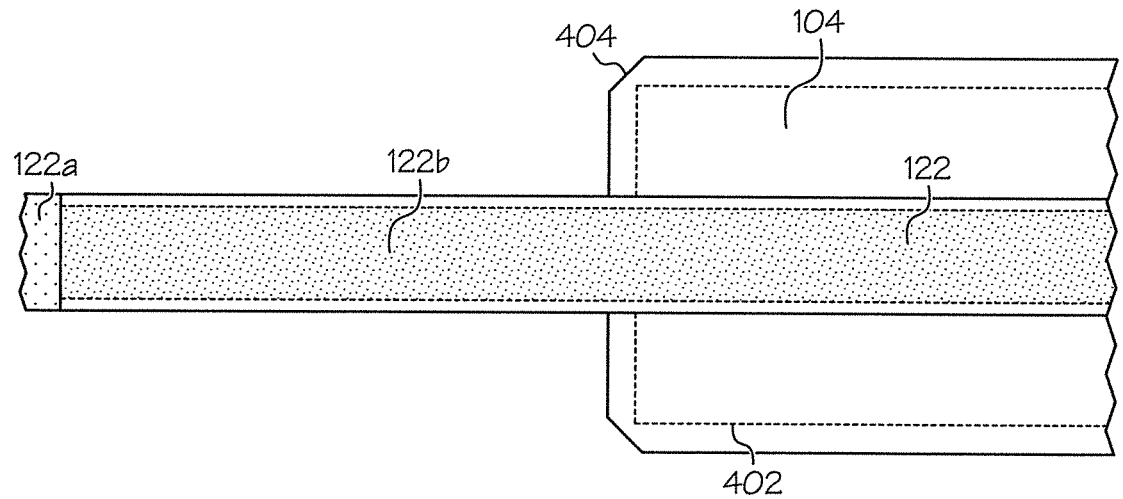
FIG. 4 depicts a diagram of an outer view of a receiver flap of the anti-cribbing collar of FIG. 1 in accordance with the principles of the present invention.

FIG. 4 depicts a diagram of an outer view of a receiver flap 114 of the anti-cribbing collar 100 of FIG. 1 in accordance with the principles of the present invention. When using previous anti-cribbing collars, horses could bite and remove anti-cribbing collars from other horses. Therefore, the present invention may be configured to reduce the risk of removal by other horses. As depicted, securing strap 122 may be attached to receiver flap 114. Furthermore, securing strap 122 may be configured with a self-attachment mechanism, such as hook and loop. For example, first securing strap attachment mechanism 122a and second securing strap attachment mechanism 122b may comprise mating sections of hook and loop. In this manner, the securing strap may be doubled back when tongue 104 is secured in the receiver 110. This can be particularly useful to retain the attachment of receiver flap 114 against the tongue 104 when securing strap 122 is doubled back through a securing ring. Securing strap 122 may be secured to receiver flap 144 by sewing a section of securing strap 122 down the length of receiver flap 114.

Receiver flap 114 may be sewn to second receiver attachment mechanism 116b. Receiver flap stitching 402 may secure the perimeter of receiver flap 114 to the corresponding hook and loop. In some embodiments, receiver flap stitching 402 may comprise 207 and/or 277 gauge thread.

Corners 404 of the receiver flap 114 may be shaped to minimize the amount of material that can be tugged by another horse. For example, corners 404 may be clipped, rounded, or any other shape to reduce the likelihood of unsecured corners 404 from sticking out such that the corner can be gripped by a horse.

Figure 5:
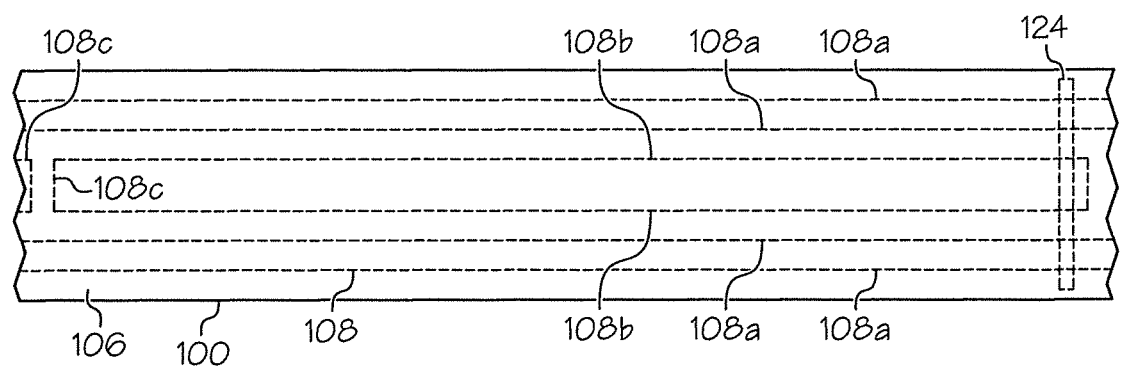
FIG. 5 depicts a diagram of an interior view of a sleeve and a base of the anti-cribbing collar of FIG. 1 in accordance with the principles of the present invention.

FIG. 5 depicts a diagram of a view of the interior side of the sleeve 106 wrapper around the rigid stock 102 of the anti-cribbing collar 100 of FIG. 1 in accordance with the principles of the present invention. As depicted, the sleeve 106 may be sewn to rigid stock 102. In general, these stitches connecting the sleeve 106 to the rigid stock 102 may be referred to as stitches 108. Stitches 108 may comprise 207 and/or 277 gauge thread. Furthermore, stitches may span part or all of the length of the collar 100. Base stitches 108a may be substantially similar to stitches 108 and may be secure the sleeve 106 to the rigid stock 102. Support stitches 108b may be substantially similar to stitches 108a, and may further secure a securing strap (further described below) along part or all of the length of collar 100. In addition, ring stitches 108c may secure a ring in place on the collar 100.

Figure 6:
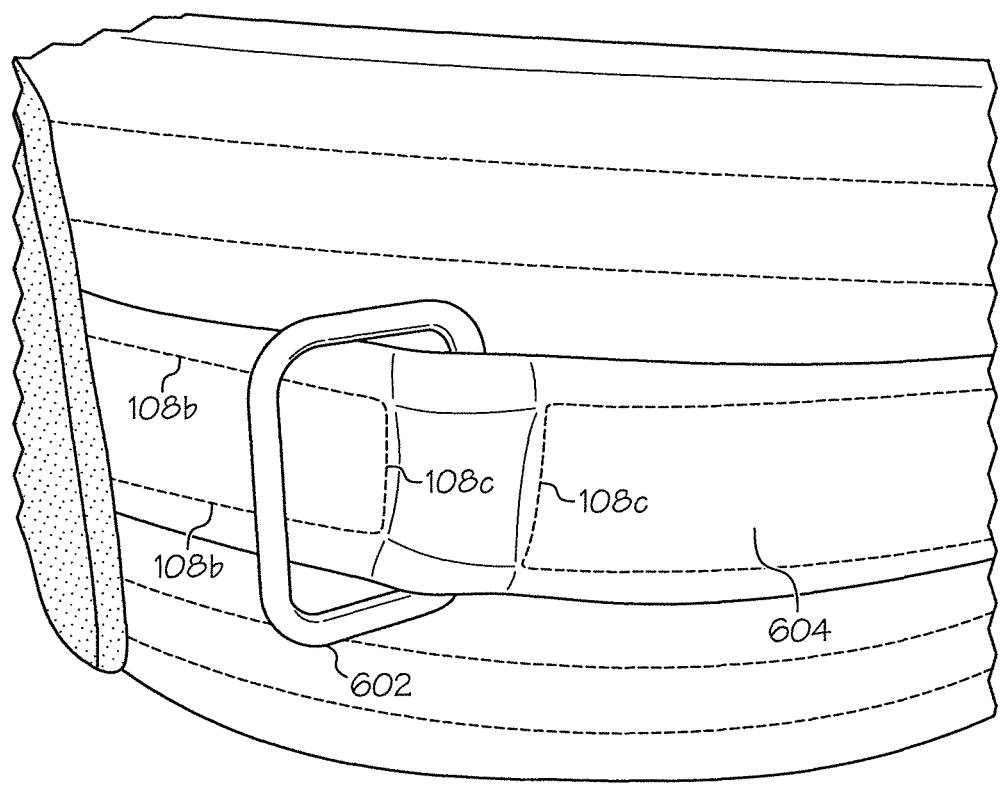
FIG. 6 depicts a diagram of a ring of the exterior of the anti-cribbing collar of FIG. 1 in accordance with the principles of the present invention.

FIG. 6 depicts a diagram of a ring 602 of the anti-cribbing collar 100 of FIG. 1 in accordance with the principles of the present invention. As described above, support stitches 108c may secure a support strap 604 to the anti-cribbing collar 100. The support strap 604 may span a portion or the entire length of the anti-cribbing collar 100. For example, the support strap 604 may span from the tongue 104 to the receiver 110. In some embodiments, the support strap 604 may span ¼, ½, or ¾ of the distances from the tongue 104 to the receiver 110.

In some embodiments, the length of support strap 604 may be sufficient to secure ring 602 to the anti-cribbing collar 100 such that the ring may withstand the force of another horse's pulling at the collar 100. The support strap 604 may comprise nylon webbing, polypropylene webbing, or any other woven or other material sufficient to withstand the tensile strength of a horse pulling against the ring 602.

The ring 602 may comprise any size or shape configured to allow securing strap 122 to loop through the ring 602 to double back on itself. Example materials include metals, composites, and other rigid materials. By way of example, the ring 602 may be shaped to securely retain securing strap 122, such as a square ring, circular ring, or other continuous or substantially continuous shape. The ring 602 may be positioned 21.5 cm (8½ in.) from a tip of the first end 101.

In some anti-cribbing collars, the ring is attached by a leather loop that is sewn and riveted over a small area, such as a few square inches or less. Another horse can easily remove the rivet and sewn leather, because the tensile stress is concentrated onto the small area of stitching and the rivet. In some embodiments of the anti-cribbing collar 100, ring 602 may be secured by ring stitches 108c. For example, the ring 602 may be sewn under the support strap 604. In this configuration, tensile stress on the ring 602 may be transferred to the support strap 604. The transferred stress may be dispersed along the anti-cribbing collar 100 over the length of the support strap 604. Ring stitches 108c may be secured at 21.3 cm (8¼ in.) and 21.8 cm (8¾ in.), respectively, from the tip of the first end 101.

Figure 7:
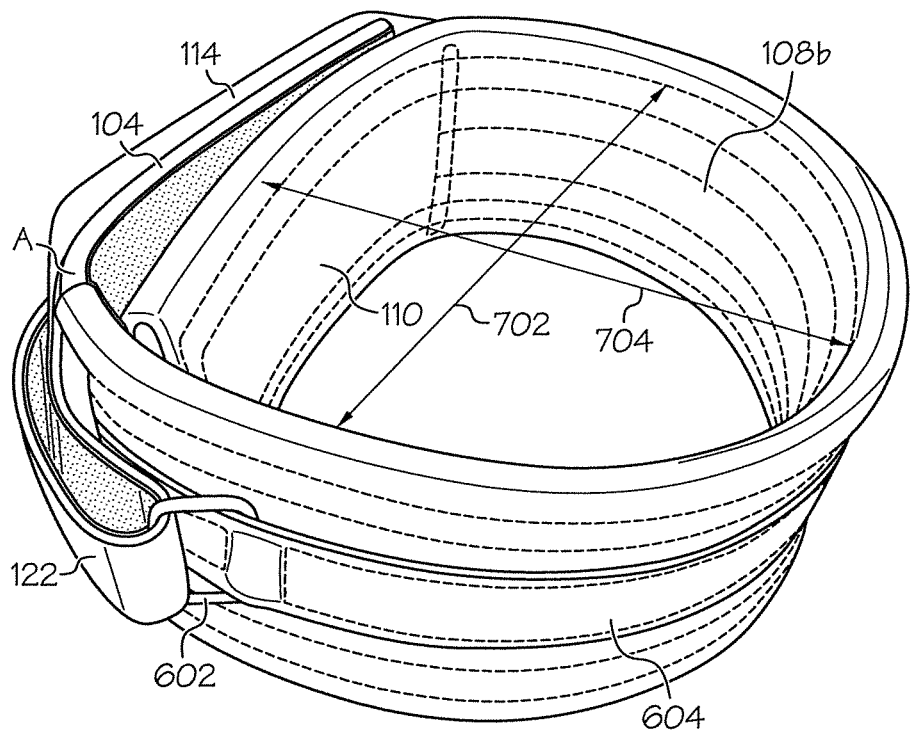
FIG. 7 depicts a diagram of the anti-cribbing collar of FIG. 1 with the tongue within the receiver and the securing strap doubled back through the ring in accordance with the principles of the present invention.

FIG. 7 depicts a diagram of the anti-cribbing collar 100 of FIG. 1 with the tongue 104 secured within the receiver 110 and the securing strap 122 doubled back through the ring 602 in accordance with the principles of the present invention. In some embodiments, the anti-cribbing collar 100 may be closed, as depicted, such that the rigid stock 102 of the receiver 110 is near or on the overlapping portion 202. A large inner diameter 702 may describe the point of greatest distance from one outer surface of the inside of the anti-cribbing collar 100 to another. A small inner diameter 704 may describe the point of least distance from one outer surface of the inside of the anti-cribbing collar 100 to another.

When the receiver base 112 is near the overlapping portion 202, a large inner diameter of the anti-cribbing collar 100 may be about 21.3 cm (8⅜ in.) or smaller. A small inner diameter of the anti-cribbing collar 100 may be about 14.9 cm (5⅞ in.) or smaller.

When the receiver base 112 is on the overlapping portion 202, a large inner diameter of the anti-cribbing collar 100 may be about 18.6 cm (7 5/16 in.) or smaller. The small inner diameter of the anti-cribbing collar 100 may be about 13.5 cm (5 13/16 in.) or smaller.

Figure 8:
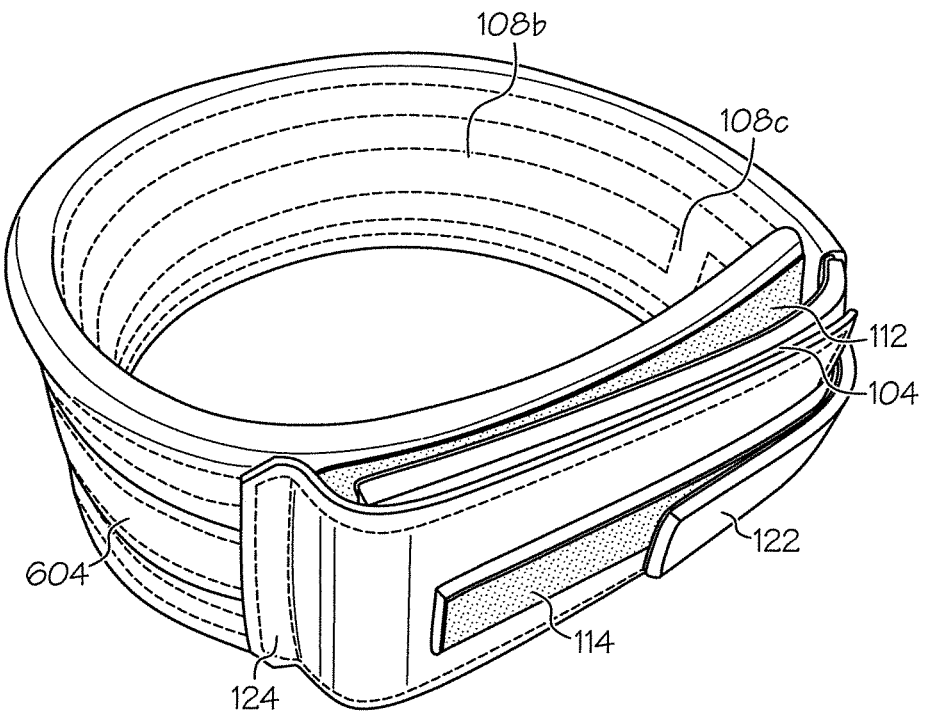
FIG. 8 depicts a diagram of another view of the anti-cribbing collar of FIG. 1 in the configuration of FIG. 7 in accordance with the principles of the present invention.

FIG. 8 depicts a diagram of another view of the anti-cribbing collar 100 of FIG. 1 in the configuration of FIG. 7 in accordance with the principles of the present invention.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A collapse resistant anti-cribbing collar comprising:
   a. a layered collar having a first end, a second end, a length, a width, a first outer layer forming an inner surface of said collar and which faces the neck of a wearer when worn, a second outer layer forming an outer surface of said collar and which faces away from the neck of a wearer when worn, and a rigid stock arranged between said first outer layer and said second outer layer, wherein said rigid stock substantially extends through the length of said collar;

b. a tongue formed along a length of said collar from said first end of said collar to a point recessed from said first end of said collar and intended to overlap said second end of said collar when said first end and second ends of said collar are arranged to form a closed loop collar configured so that said rigid stock overlaps itself to prevent the formation of a pinch point, wherein said tongue possesses a first side forming an inner layer of said collar and a second side forming an outer layer of said collar c. a receiver to mate with and secure said tongue, said receiver possessing a receiver base, a first receiver attachment mechanism, and a second receiver attachment mechanism, wherein said first receiver attachment mechanism comprises a receiver flap having an inner surface, an outer surface, a free end, and an affixed end, wherein said affixed end is hingedly affixed to said outer layer of said collar at a hinge joint recessed from said second end of said collar and configured to removably affix said second side of said tongue to said inner surface of said receiver flap and said second receiver attachment mechanism is configured to removably affix said first side of said tongue to a receiver base affixed to said outer layer of said collar between said second end and a point recessed from said second end; and d. a securing strap having a length, a first surface, a second surface, an affixed end, and a free end, wherein said securing strap is affixed to said outer surface of said receiving flap, said second surface of said securing strap is in communication with said outer surface of said receiving flap and is arranged to project over and beyond said free end of said receiving flap which is received by a ring affixed to said collar at a point recessed from said first end and which secures said receiving flap against said outer layer of said collar.

2. The anti-cribbing collar of claim 1, wherein hook and loop fabric is affixed to said first side and said second side of said tongue, said receiver base, and said inner surface of said receiver flap.

3. The anti-cribbing collar of claim 2, wherein said securing strap possesses hook and loop fabric affixed to said first surface of said securing strap and is configured to pass through said ring and back towards said receiving flap to secure said free end of said securing strap to itself.

4. The anti-cribbing collar of claim 1, wherein said first outer layer and said second outer layer are joined so as to form a sleeve, wherein said sleeve encloses said rigid stock.

5. The anti-cribbing collar of claim 1, wherein said first outer layer of said collar is smooth so as to not irritate the neck of the wearer.

6. The anti-cribbing collar of claim 1, wherein said ring is secured to said outer surface of said second layer of said collar by ring stitches.

7. The anti-cribbing collar of claim 3, wherein said hook and loop fabric on said first side of said securing strap is configured to pass through said ring and back towards said receiving flap to secure.

* * * * *